United States Patent
Meza et al.

(10) Patent No.: US 9,757,989 B2
(45) Date of Patent: Sep. 12, 2017

(54) TIRE WITH RIBBED TREAD

(71) Applicant: The Goodyear Tire & Rubber Company, Akron, OH (US)

(72) Inventors: Roberto Cerrato Meza, North Canton, OH (US); Warren James Busch, North Canton, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 168 days.

(21) Appl. No.: 14/155,424

(22) Filed: Jan. 15, 2014

(65) Prior Publication Data

US 2014/0255654 A1 Sep. 11, 2014

Related U.S. Application Data

(60) Provisional application No. 61/776,087, filed on Mar. 11, 2013.

(51) Int. Cl.
| | | |
|---|---|---|
| *B60C 11/03* | (2006.01) | |
| *C08L 7/00* | (2006.01) | |
| *C08L 9/00* | (2006.01) | |
| *B60C 1/00* | (2006.01) | |

(52) U.S. Cl.
CPC ........ *B60C 11/0302* (2013.01); *B60C 1/0016* (2013.04); *C08L 7/00* (2013.01); *C08L 9/00* (2013.01); *B60C 2200/06* (2013.04); *Y10T 428/24579* (2015.01)

(58) Field of Classification Search
CPC ..... B60C 1/00; B60C 1/0016; B60C 11/0302; B60C 2200/06; B60C 2011/0341; Y02T 428/24579; C08K 5/44; C08L 7/00; C08L 9/00

USPC .................. 152/208, 209.1, 209.5; 428/168; 524/493, 495

See application file for complete search history.

(56) References Cited

U.S. PATENT DOCUMENTS

| | | | | |
|---|---|---|---|---|
| 4,262,721 | A | * | 4/1981 | Tadokoro ............ B60C 11/0083 |
| | | | | 152/209.14 |
| 4,430,466 | A | * | 2/1984 | Cooper .......................... 524/83 |
| 5,174,838 | A | | 12/1992 | Sandstrom et al. ...... 152/209 R |
| 5,336,730 | A | | 8/1994 | Sandstrom et al. ........ 525/332.6 |
| 8,460,494 | B2 | | 6/2013 | Sandstrom et al. ....... 156/110.1 |

(Continued)

FOREIGN PATENT DOCUMENTS

| | | |
|---|---|---|
| EP | 2072282 A1 | 6/2009 |
| EP | 2233521 A1 | 9/2010 |

(Continued)

OTHER PUBLICATIONS

European Search Report received by Applicants on Jul. 14, 2014.

*Primary Examiner* — Josephine Chang
(74) *Attorney, Agent, or Firm* — Henry C. Young, Jr.

(57) ABSTRACT

The invention relates to pneumatic tires with ribbed rubber treads which may be, for example pneumatic tires such as bus tires and truck tires. The rubber treads are comprised of a blend of specialized cis 1,4-polybutadiene rubber and cis 1,4-polyisoprene rubber containing reinforcing filler comprised of a combination of rubber reinforcing carbon black and precipitated silica together with silica coupler, wherein the tread rubber contains a cure package comprised of sulfur together with two sulfenamide primary sulfur cure accelerators.

1 Claim, 2 Drawing Sheets

(56) References Cited

U.S. PATENT DOCUMENTS

Figure 1:
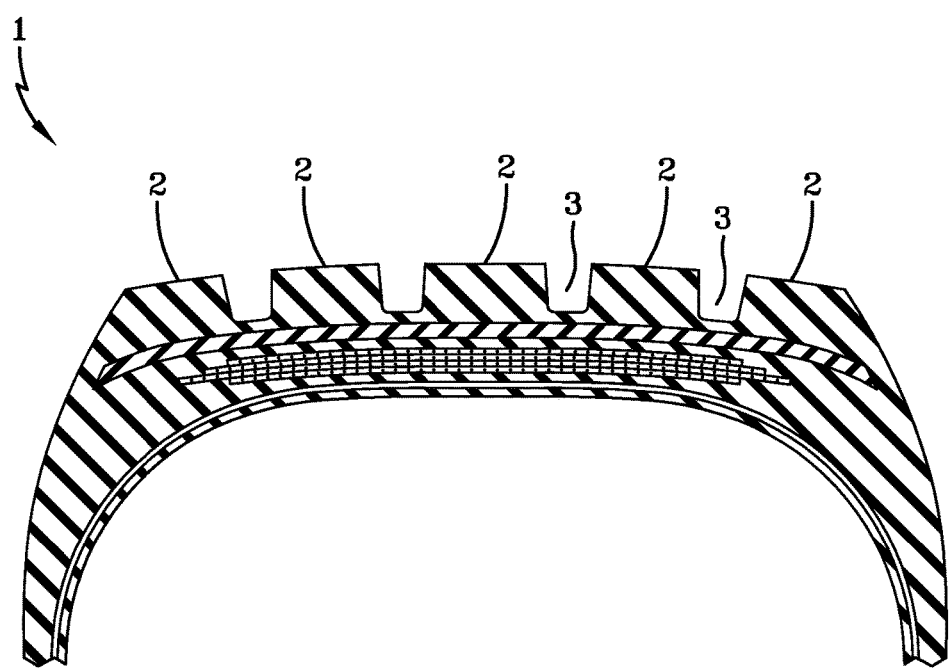

| | | |
|---|---|---|
| 2006/0063878 A1 | 3/2006 | Sandstrom et al. |
| 2009/0306267 A1* | 12/2009 | York .................... C08K 5/0025 524/430 |
| 2010/0059160 A1 | 3/2010 | Sandstrom |
| 2010/0186869 A1 | 7/2010 | Sandstrom et al. |
| 2011/0112215 A1 | 5/2011 | Kojima |
| 2012/0252915 A1 | 10/2012 | Maesaka et al. |
| 2012/0305153 A1 | 12/2012 | Zhao |
| 2012/0309891 A1 | 12/2012 | Zhao |
| 2012/0325391 A1 | 12/2012 | Miyazaki |

FOREIGN PATENT DOCUMENTS

| | | | |
|---|---|---|---|
| EP | 2412544 A1 | | 2/2012 |
| GB | 2051694 A | * | 1/1981 |

* cited by examiner

TIRE WITH RIBBED TREAD

This application claims the benefit of U.S. Provisional Application No. 61/776,087, filed Mar. 11, 2013.

FIELD OF THE INVENTION

The invention relates to pneumatic tires with ribbed treads which may be, for example pneumatic tires such as bus tires and truck tires.

BACKGROUND OF THE INVENTION

Pneumatic rubber tires conventionally have treads of lug and groove configuration composed of individual tread lugs circumferentially spaced around the tire.

However, for some pneumatic tires, particularly tires for buses, it is desired that their rubber treads are configured with a lugs which comprise a plurality of circumferential continuous ribs with intervening grooves.

It is envisioned that such pneumatic tire tread configuration present challenges in a sense of providing such rib configured tread with rubber composition to promote a combination of stiffness to promote handling for the tire, reduced hysteresis (indicated by a rebound physical property) to promote reduced internal heat buildup within the tread ribs during service and resistance to abrasion (e.g. to promote resistance to tread wear at the road-contacting surface of the tread).

While it may be thought of to provide such tread rubber as a cis 1,4-polybutadiene rubber rich rubber composition to promote resistance to tread wear (resistance to abrasion) and, further, to provide a significant level of rubber reinforcing carbon black content to promote increased stiffness, it is recognized that such inclusions for a circumferential ribbed tire tread would also promote increased hysteresis for the rubber composition, and generally promotes an unwanted, internal heat buildup within the tread during tire service. Also, increase rubber processing challenges are promoted which includes processing the uncured rubber composition involving mixing the rubber composition in an internal rubber mixer and, also shaping it by extrusion processes because of expected increased viscosity of the uncured rubber composition having been promoted by both the increased carbon black and cis 1,4-polybutadiene rubber contents of the rubber composition.

For this invention, a combination of alternatives is to be evaluated for promoting both cured tread rubber properties and acceptable uncured rubber processing for preparation of a ribbed tread for heavy duty use for a bus or truck.

In one embodiment, use of a cis 1,4-polybutadiene rubber with a high heterogeneity index is proposed to promote processability of the cis 1,4-polybutadiene rubber.

In one embodiment, a controlled level of rubber reinforcing carbon black is proposed where a high reinforcing rubber reinforcing carbon black is proposed.

In one embodiment, a low level of precipitated silica is proposed to promote acceptable hysteresis in terms of rubber rebound physical property to promote lesser internal heat buildup in the tread together with an associated low level (relatively low content in terms of phr) of silica coupler to promote less viscosity buildup in the uncured rubber composition as it is processed.

In one embodiment a cure package for the rubber composition is proposed with a relatively low ratio of sulfur to sulfur cure accelerator to promote a relatively low sulfur cure density of the rubber composition.

In one embodiment, a sulfur cure accelerator combination of two primary sulfur cure accelerators comprised of two different sulfenamide based accelerators without, and therefore in an absence of, a secondary sulfur cure accelerator such as, for example, diphenyl guanidine, thiuram mono and disulfides, dithiocarbonates and ditolyguanidine, to promote a rate of cure of the rubber composition without necessitating use of a sulfur cure rate retarder to prevent scorching (preventing too high rate of vulcanization) of the rubber composition.

In the description of this invention, terms such as "compounded rubber", "rubber compound" and "compound", if used herein, refer to rubber compositions containing of at least one elastomer blended with various ingredients, including curatives such as sulfur and cure accelerators. The terms "elastomer" and "rubber" may be used herein interchangeably unless otherwise indicated. It is believed that such terms are well known to those having skill in such art.

DISCLOSURE AND PRACTICE OF THE INVENTION

In accordance with this invention, a pneumatic rubber tire is provided having a polybutadiene-rich rubber tread of a rib and groove configuration comprised of at least three circumferential ribs with intervening grooves comprised of (preferably exclusive of trans 1,4 polymers) based on parts by weight per 100 parts by weight of the tread rubber (phr), (A) about 70 to about 90, phr of specialized cis 1,4-polybutadiene rubber, and (B) about 10 to about 30 phr of natural cis 1,4-polyisoprene rubber wherein said specialized cis 1,4-polybutadiene rubber, has a microstructure comprised of about 96 to about 99 percent cis 1,4-isomeric units, a number average molecular weight (Mn) in a range of from about 150,000 to about 200,000 and a heterogeneity index (Mw/Mn) in a range of from about 2/1 to about 3.5/1 (a relatively high heterogeneity index range illustrating a significant disparity between its number average and weight average molecular weights), (C) about 35 to about 55 phr of rubber reinforcing carbon black, (D) about 5 to about 15 phr of precipitated silica (amorphorous synthetic silica) together with from about 1 to about 3 phr of silica coupler comprised of a bis(3-triethoxysilylpropyl)polysulfide containing an average in a range of from about 3.5 to about 3.8 connecting sulfur atoms in its polysulfidic bridge;

(E) a cure package comprised of sulfur and sulfur cure accelerators, wherein said sulfur cure accelerators are composed of two primary sulfur cure accelerators, (preferably in an absence of secondary sulfur cure accelerator(s) such as, for example, diphenyl guanidine), comprised of:

(1) a first N-cyclohexyl-2-benzothiazolesulfenamide, and (2) a second N-tert-butyl-2-benzothiazolesulfenamide wherein the ratio of said first sulfenamide to said second sulfenamide is in range of from about 0.4/1 to about 4/1.

In one embodiment, the sulfur cure accelerators are exclusive of a secondary sulfur cure accelerator exemplary of which is, for example, diphenyl guanidine.

A significant aspect of this invention is the thermal stability of the rubber composition in a sense of an observation of its resistance to reversion of its state of cure without use of an anti-reversion agent such as for example at least one of 1,3-bis-(citraconimidomethyl)benzene and hexamethylene bis(thiosulfate), disodium salt, dehydrate.

Therefore in one embodiment the rubber composition is exclusive of an anti-reversion agent, representative of which is, for example, Perkalink™ 900 from Flexysis.

In another embodiment, if desired, the rubber may contain an anti-reversion agent such as, for example, the Perkalink™ 900 (e.g. 1,3-bis-(citraconimidomethyl)benzene).

In one embodiment, whereas the precipitated silica coupling agent used is comprised of a bis(3-triethoxysilylpropyl)polysulfide containing an average in a range of from about 3.5 to about 3.8 connecting sulfur atoms in its polysulfidic bridge, it is to appreciated that, if desired, a precipitated silica coupling agent may be used (although not preferred for this application) comprised of a bis(3-triethoxysilylpropyl)polysulfide containing an average in a range of from about 2 to about 2.6 connecting sulfur atoms in its polysulfidic bridge.

This invention is considered to be significant in a sense that its practice is considered to be a departure from past practices for a rubber tire having a circumferentially ribbed tire tread whose elastomer would be composed of a cis 1-4-polybutadiene rubber as a major rubber constituent in the polybutadiene/natural cis 1,4-polyisoprene rubber by utilizing a combination of specialized polybutadiene rubber, low level of silica reinforcement with an accompanying sulfur cure package to promote processing ability for the uncured rubber composition in combination with promoting various beneficial cured rubber properties for the rubber composition.

THE DRAWINGS

Figure 2:
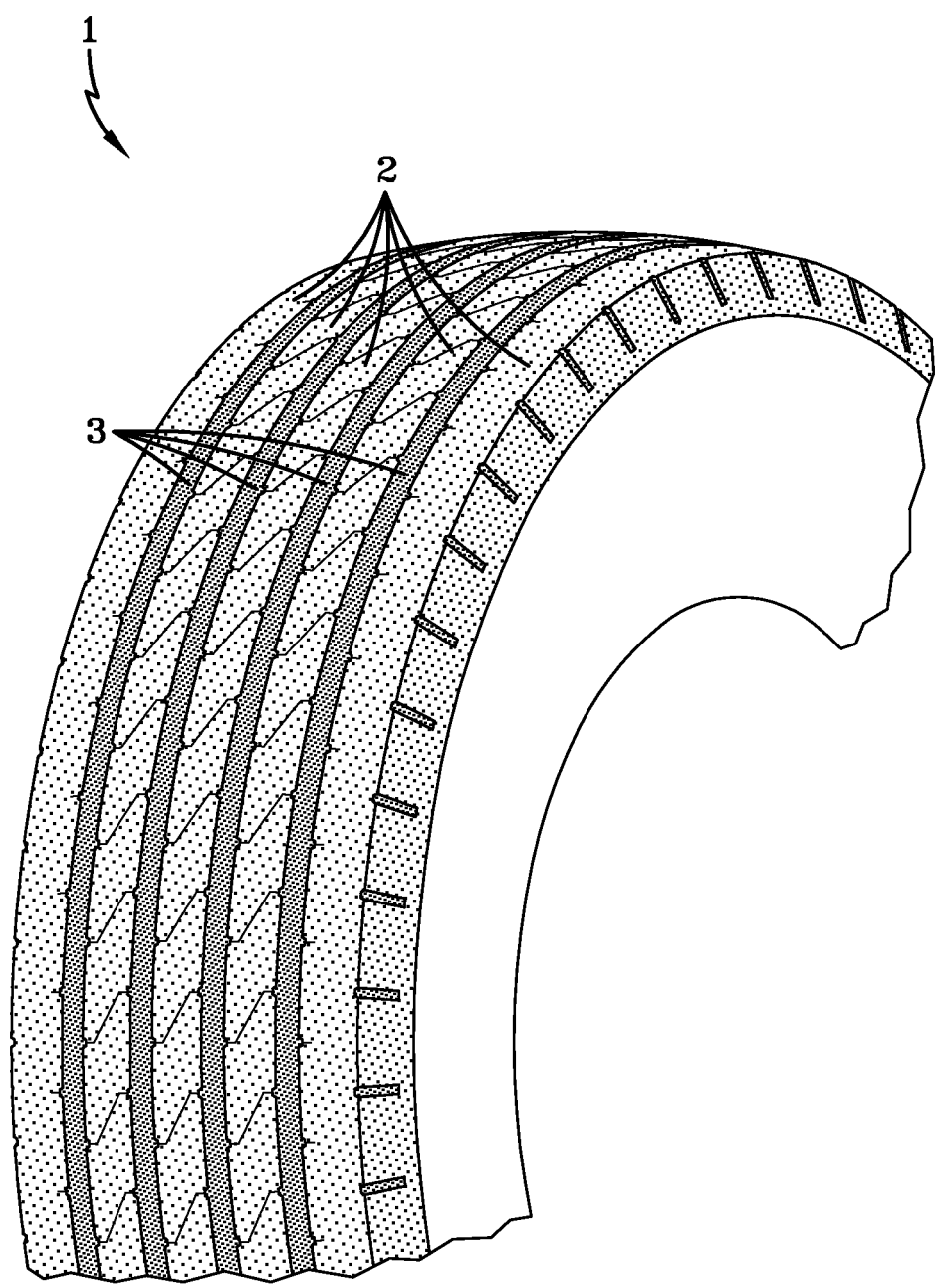

Drawings are provided to present perspective views of a tire with a ribbed tread as FIGS. 1 and 2.

IN THE DRAWINGS

FIGS. 1 and 2 (FIGS. 1 and 2) are perspective views of a tire (1) with tread configuration composed of a plurality of circumferentially continuous ribs (2) with intervening grooves (3).

In one embodiment the rubber reinforcing carbon black is a relatively small particle sized, high structure, rubber reinforcing carbon black having an Iodine adsorption value (ASTM D1510) in a range of about 110 to about 150 g/kg, which is indicative of a relatively small sized carbon black together with a dibutylphthalate (DBP) value (ASTM D2414) in a range of about 110 to about 140, cc/100 g, which is indicative of a high structure carbon black. Representative of such small sized, high structure, rubber reinforcing carbon blacks are, for example, ASTM designated rubber reinforcing carbon blacks as, for example, ASTM referenced N110 and N121 carbon blacks. Examples of various rubber reinforcing carbon blacks together with their Iodine number values and DBP values, may be found in *The Vanderbilt Rubber Handbook*, (1990), 13th edition, Pages 416 through 419.

Use of the small sized, high structure, rubber reinforcing carbon black(s), with the indicated Iodine adsorption value range and DBP value range, is considered herein to be important in order to promote good abrasion resistance, or coefficient of friction, and higher stiffness for the tire tread to promote cornering and handling of the tire, with its ribbed tread configuration and also promoting a balance of a relatively high hysteresis and tear resistance which are desirable properties for the tread rubber for the ribbed tread.

In practice, said coupling agent is desirably comprised of a bis(3-triethoxysilylpropyl)polysulfide having an average of from about 3.5 to a about 3.8 connecting sulfur atoms in its polysulfidic bridge, instead of an average of from about 2 to about 2.6 connection sulfur atoms for a purpose of promoting a balanced crosslink density for the rubber composition Such coupling agents are well known to those having skill in such art.

In practice, it is envisioned that the specialized polybutadiene elastomer may be a nickel catalyst promoted polymerized 1,3-butadiene monomer in an organic solvent solution such as, for example polymerization of 1,3-polybutadiene monomer in an organic solvent solution in the presence of a catalyst system as described in U.S. Pat. No. 5,451,646 which is based on polymerization of 1,3-butadiene monomer with a catalyst system comprised of, for example, a combination of an organonickel compound (e.g. nickel salt of a carboxylic acid), organoaluminum compound (e.g. trialkylaluminum) and fluoride containing compound (e.g. hydrogen fluoride or complex thereof).

Therefore, the catalyst for preparation of said specialized polybutadiene elastomer is exclusive of titanium, cobalt or neodymium based catalysts used for polymerization of 1,3-butadiene monomer to prepare cis 1,4-polybutadiene elastomers.

For this evaluation, a purpose of inclusion of the specialized polybutadiene with its relatively high number average molecular weight, relatively high homogeneity index (HI) and somewhat low Tg is to promote higher rebound values for the rubber composition which is indicative of relatively low hysteresis and predictive of less internal heat generation, and therefore less temperature build-up for the rubber composition when it is being worked and predictive of better (lower) rolling resistance for a tire with a tread of such rubber composition which contains the specialized polybutadiene rubber. A further purpose is to promote greater abrasion resistance of the rubber composition which is predictive of better resistance to treadwear for a tire with such rubber composition which contains the specialized polybutadiene rubber.

Representative of said specialized cis 1,4-polybutadiene rubber for use in this invention is, for example, Budene™ 1280 from The Goodyear Tire & Rubber Company. While the technical aspect may not be fully understood, it is a feature of this invention that the specialized cis 1,4-polybutadiene rubber is differentiated from other cis 1,4-polybutadiene rubbers as being required to be the product of organic solvent solution polymerization of 1,3-butadiene monomer in the presence of a nickel compound based catalyst instead of lithium, cobalt or neodymium based polymerization catalysts and to apparently have a significant degree of branched configuration, as indicated by its relatively high heterogeneity index which is understood to promote processability in its unvulcanized state.

In the practice of this invention, use of the relatively small amount of precipitated silica reinforcement in the cis 1,4-polybutadiene rubber rich rubber composition, used in combination with the associated relatively small silica coupler content, is considered herein to be important in order to optimize resistance to the rubber composition's abrasion (resistance to tread wear) and to promote a suitable hysteresis (e.g. reduced or acceptable rolling resistance for the tire) as well as suitable tear strength for the polybutadiene rubber-rich rubber composition.

While this phenomenon may not be fully understood, it is envisioned that such aforesaid branching of the specialized polybutadiene may provide a significant contribution to promoting such processability of the uncured rubber composition and cured physical properties for a specialized polybutadiene-rich tire tread.

The precipitated silica for the reinforcing filler is a synthetic amorphous silica such as, for example, those obtained by the acidification of a soluble silicate (e.g., sodium silicate or a co-precipitation of a silicate and an aluminate). Such precipitated silicas are, in general, well known to those having skill in such art.

The BET surface area of the synthetic silica (precipitated silica), as measured using nitrogen gas, may, for example, be in a range of about 50 to about 300, alternatively about 120 to about 200, square meters per gram.

The silica may also have a dibutylphthalate (DBP) absorption value in a range of, for example, about 100 to about 400, and usually about 150 to about 300 cc/g.

Various commercially available synthetic silicas, particularly precipitated silicas, may be considered for use in this invention such as, for example, only and without limitation, silicas commercially available from PPG Industries under the Hi-Sil trademark with designations 210, 243, etc; silicas available from Rhodia, with designations of Zeosil 1165MP and Zeosil 165GR and silicas available from Degussa AG with designations VN2 and VN3, 3770GR, and from Huber as Zeopol 8745.

As indicated the relatively low level of silica reinforcement for the rubber tire tread is used with an associated low level of silica coupling agent.

The following Table A presents various desirable physical properties for the tread rubber for the polybutadiene rubber-rich ribbed rubber tread.

TABLE A

| | |
|---|---|
| Tear resistance, 95° C., of the cured rubber, (Newtons) | at least 140 |
| Dynamic storage modulus G', 100° C., of the uncured rubber (MPa) (15% strain, 100° C. and 0.83 Hertz RPA evaluation conditions) | less than 0.25 |
| Grosch abrasion rate (high severity), mg/km, of the cured rubber | less than 400 |
| Heterogeneity index of the specialized cis 1,4-polybutadiene | from 2/1 to about 3.5/1 |

It is readily understood by those having skill in the art that the rubber compositions of the tread would be compounded with conventional compounding ingredients including the aforesaid reinforcing fillers such as carbon black and precipitated silica, as hereinbefore defined, in combination with a silica coupling agent, as well as antidegradant(s), processing oil as hereinbefore defined, fatty acid comprised of, for example, stearic, oleic, palmitic, and possibly linolenic, acids, zinc oxide, sulfur-contributing material(s) and vulcanization accelerator(s) as hereinbefore mentioned.

Processing aids may be used, for example, waxes such as microcrystalline and paraffinic waxes, in a range, for example, of about 1 to 5 phr or about 1 to about 3 phr; and resins, usually as tackifiers, such as, for example, synthetic hydrocarbon and natural resins in a range of, for example, about 1 to 5 phr or about 1 to about 3 phr. A curative might be classified as sulfur together with one or more sulfur cure accelerator(s). In a sulfur and accelerator(s) curative, the amount of sulfur used may be, for example, from about 0.5 to about 5 phr, more usually in a range of about 0.5 to about 3 phr; and the accelerator(s), often of the sulfenamide type, is (are) used in a range of about 0.5 to about 5 phr, often in a range of about 1 to about 2 phr. The ingredients, including the elastomers but exclusive of sulfur and accelerator curatives, are normally first mixed together in a series of at least two sequential mixing stages, although sometimes one mixing stage might be used, to a temperature in a range of, for example, about 145° C. to about 185° C., and such mixing stages are typically referred to as non-productive mixing stages. Thereafter, the sulfur and accelerators, and possibly one or more retarders and possibly one or more antidegradants, are mixed therewith to a temperature of, for example, about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well-known to those having skill in such art.

The invention may be better understood by reference to the following example in which the parts and percentages are by weight unless otherwise indicated.

EXAMPLE I

Rubber compositions were prepared to rubber compositions for the ribbed rubber tread.

Rubber compositions are referred in this Example as rubber Samples A, B and C.

Rubber Sample A is a Comparative Sample based on natural rubber.

Experimental rubber Samples B and C are experimental rubber samples based on a specialized cis 1,4-polybutadiene rubber used with a minor amount of natural rubber.

The basic rubber composition formulation is shown in Table 1 and the ingredients are expressed in parts by weight per 100 parts rubber (phr) unless otherwise indicated.

The rubber compositions may be prepared by mixing the elastomers(s) without sulfur and sulfur cure accelerators in a first non-productive mixing stage (NP-1) in an internal rubber mixer for about 4 minutes to a temperature of about 160° C. If desired, the rubber mixture may then mixed in a second non-productive mixing stage (NP-2) in an internal rubber mixer for about 4 minutes to a temperature of about 160° C. without adding additional ingredients. The resulting rubber mixture may then mixed in a productive mixing stage (PR) in an internal rubber mixer with sulfur and sulfur cure accelerator(s) for about 2 minutes to a temperature of about 110° C. The rubber composition may then sheeted out and cooled to below 50° C. between each of the non-productive mixing steps and prior to the productive mixing step. Such rubber mixing procedure is well known to those having skill in such art.

TABLE 1

| | Parts (phr) |
|---|---|
| First Non-Productive Mixing Step (NP1) - Mixed to 160° C. | |
| Natural cis 1,4-polyisoprene rubber (SMR20) | 20, 40 or 100 |
| Specialized cis 1,4-polybutadiene rubber[1] | 0, 60 or 80 |
| Carbon black, rubber reinforcing (N121)[2] | 47 |
| Silica, precipitated[3] | 10 |
| Silica coupling agent[4] | 5 |
| Wax microcrystalline and paraffin | 2 |
| Fatty acid[5] | 3 |

TABLE 1-continued

| | Parts (phr) |
|---|---|
| Antioxidants | 2.6 |
| Zinc oxide | 3 |
| Productive Mixing Step (PR) - Mixed to 110° C. | |
| Sulfur | 1.5 |
| Accelerator(s)[6] | 1.6 |

[1]Specialized cis 1,4-polybutadiene rubber (said organic solvent solution polymerized 1,3-butadiene monomer in the presence of a nickel based catalyst) as Budene ™ 1280 from The Goodyear Tire & Rubber Company having a heterogeneity index in a range of from about 2/1 to about 3.5/1.
[2]Rubber reinforcing carbon black as N121, an ASTM designation
[3]Precipitated silica as Hi Sil HPD 320 from the PPG Company
[4]Coupling agent comprised of bis(3-triethoxysilylpropyl) polysulfide having an average of from about 3.5 to about 3.8 connecting sulfur atoms as Si69 ™ from Evonik
[5]Mixture comprised of stearic, palmitic and oleic acids
[6]Sulfur cure accelerators as a combination of N-ter-butyl-2-benzothiazole sulfenamide & N-cyclohexyl benzothiazole-2-sulfenamide in a ratio of about 1.5/1

The following Table 2 represents the uncured and cured behavior and various physical properties of the rubber compositions based upon the basic formulation of Table 1, and reported as rubber Samples A, B and C.

TABLE 2

| | Control | Experimental | |
|---|---|---|---|
| | A | B | C |
| Natural rubber - SMR-20 (phr) | 100 | 20 | 40 |
| Specialized cis 1,4-polybutadiene rubber (phr) | 0 | 80 | 60 |
| Properties | | | |
| RPA test | | | |
| Uncured dynamic storage modulus G' (MPa) at 15% strain, 100° C. and 0.83 Hertz | 0.2 | 0.206 | 0.25 |
| At 10% strain, 11 Hertz, 100° C.; | | | |
| Dynamic storage modulus G' (MPa) | 1.085 | 1.280 | 1.195 |
| Tan delta | 0.150 | 0.159 | 0.176 |
| MDR test; 60 minutes at 150° C. | | | |
| Reversion resistance[3] (%) (lower is better) | 10.6 | 1.58 | 11 |
| Stress-strain | | | |
| Tensile strength (MPa) | 22.5 | 18.1 | 22.76 |
| Elongation at break (%) | 450 | 469 | 550 |
| 300% modulus, ring, (MPa) | 14.7 | 10.81 | 10.66 |
| Rebound (Zwick) | | | |
| 23° C. | 47.8 | 47.5 | 45 |
| 100° C. | 65 | 58 | 58 |
| Shore A Hardness | | | |
| 23° C. | 70 | 65 | 65 |
| 100° C. | 58 | 59 | 58 |
| Tear strength[1], N at 95° C. | 155 | 150 | 150 |
| Abrasion rate (mg/km), Grosch[2] | | | |
| High severity (70 N), 12° slip angle, disk speed = 20 km/hr, distance = 250 meters (lower is better) | 606 | 330 | 437 |

[1]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.

[2]The Grosch abrasion rate run on an LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a low abrasion severity test may be run, for example, at a load of 20 Newtons, 2° slip angle, disk speed of 40 km/hr for a distance of 7,500 meters; a medium abrasion severity test may be run, for example, at a load of 40 Newtons, 6° slip angle, disk speed of 40 km/hr and distance of 1,000 meters; a high abrasion severity test may be run, for example, at a load of 70 Newtons, 12° slip angle, disk speed of 20 km/hr and distance of 250 meters; and an ultra high abrasion severity test may be run, for example, at a load of 70 Newtons, 16° slip angle, disk speed of 20 km/hr and distance of 500 meters.
[3]Reversion resistance as a percent loss of sulfur cure state of a rubber composition by MDR (moving die rheometer) analytical instrument measurement which is a measure of stability of its sulfur crosslink network.

From Table 2 it can be seen that the polybutadiene-rich rubber Experimental rubber Sample B containing 80 phr of the specialized cis 1,4-polybutadiene rubber of this invention promoted a beneficial balance of physical properties including resistance to abrasion as indicated by the relatively low High Severity Grosch abrasion rate of only 330 mg/gm, acceptable tear strength of 150 Newtons, stiffness as indicated by its loss modulus G' and beneficial thermal stability as observed resistance to reversion for a pneumatic rubber tire with tread configured with circumferential ribs and intervening grooves which may be intended for heavy accelerating, braking, and turning.

This is considered as being significant in a sense of the rubber Sample B's enhanced abrasion resistance and stiffness for promoting cornering and handling of the tire, while balancing hysteresis and tear resistance that make it a candidate for heavy wear applications.

It is concluded that the utilization of a specialized cis 1-4-polybutadiene rubber as a major rubber constituent in a polybutadiene/natural cis 1,4-polyisoprene rubber composition, in combination with a highly rubber reinforcing carbon black, and an optimized sulfur cure package for a tire with ribbed tread configuration intended for use as a bus or truck tire.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a polybutadiene-rich rubber tread of a rib and groove configuration comprised of at least three circumferential ribs with intervening grooves where said tread is of a rubber composition comprised of, based on parts by weight per 100 parts by weight of the tread rubber (phr),
    (A) about 70 to about 90 phr of specialized cis 1,4-polybutadiene rubber, and
    (B) about 10 to about 30 phr of natural cis 1,4-polyisoprene rubber
    wherein said specialized cis 1,4-polybutadiene rubber, has a microstructure comprised of about 96 to about 99 percent cis 1,4-isomeric units, a number average molecular weight (Mn) in a range of from about 150,000 to about 200,000 and a heterogeneity index (Mw/Mn) in a range of from about 2/1 to about 3.5/1 and wherein the specialized cis 1,4-polybutadiene rubber is the product of organic solvent solution polymerization of 1,3-butadiene in the presence of a nickel compound based catalyst,
    (C) about 35 to about 55 phr of rubber reinforcing carbon black;

(D) about 5 to about 15 phr of precipitated silica together with from about 1 to about 3 phr of silica coupler comprised of a bis(3-triethoxysilylpropyl) polysulfide containing an average in a range of from about 3.5 to about 3.8 connecting sulfur atoms in its polysulfidic bridge;

(E) a cure package consisting of sulfur and primary sulfur cure accelerators to the exclusion of a secondary sulfur cure accelerator comprised of diphenyl guanidine wherein said cure package is exclusive of cure reversion agent consisting of at least one of 1,3-bis-(citraconimidomethyl)benzene and hexamethylene bis(thiosulfate), disodium salt, dehydrate, wherein said primary sulfur cure accelerators consist of a combination of:
 (1) a first primary sulfur cure accelerator as N-cyclohexyl-2-benzothiazolesulfenamide, and
 (2) a second primary sulfur cure accelerator as N-tert-butyl-2-benzothiazolesulfenamide;

wherein a ratio of said first primary sulfur cure accelerator to said second primary sulfur cure accelerator is in a range of from about 0.4/1 to about 4/1 wherein said rubber reinforcing carbon black has an Iodine adsorption value (ASTM D1510) in a range of about 110 to about 150 g/kg and a dibutylphthalate (DBP) value (ASTM D2414) in a range of about 110 to about 140 cc/100 g.

* * * * *